US005608902A

United States Patent [19]
Iijima

[11] Patent Number: 5,608,902
[45] Date of Patent: Mar. 4, 1997

[54] FILE MANAGEMENT SYSTEM FOR MEMORY CARD

[75] Inventor: Yasuo Iijima, Yokohama, Japan

[73] Assignee: Kabushiki Kaisha Toshiba, Kawasaki, Japan

[21] Appl. No.: 352,581

[22] Filed: Dec. 9, 1994

[30] Foreign Application Priority Data

Dec. 10, 1993  [JP]  Japan ................................ 5-310172

[51] Int. Cl.$^6$ ............................................. G06F 17/30
[52] U.S. Cl. ............................ 395/616; 364/DIG. 1; 364/222.81
[58] Field of Search ........................................ 395/600

[56] References Cited

U.S. PATENT DOCUMENTS

| | | | |
|---|---|---|---|
| 4,893,236 | 1/1990 | Ohnishi et al. | 364/405 |
| 4,930,129 | 5/1990 | Takahira | 371/40.4 |
| 4,939,669 | 7/1990 | Nishino | 395/117 |
| 4,988,855 | 1/1991 | Iijima | 235/492 |
| 5,038,539 | 8/1991 | Kelley et al. | 52/239 |
| 5,060,170 | 10/1991 | Bourgeois et al. | 395/157 |
| 5,161,256 | 11/1992 | Iijima | 902/26 |
| 5,193,171 | 3/1993 | Shinmura et al. | 395/440 |
| 5,226,155 | 7/1993 | Iijima et al. | 395/600 |
| 5,237,682 | 8/1993 | Bendert et al. | 395/600 |
| 5,285,200 | 2/1994 | Kuryjama | 340/825.34 |
| 5,289,470 | 2/1994 | Chang et al. | 370/94.1 |
| 5,325,430 | 6/1994 | Smyth et al. | 380/4 |
| 5,327,497 | 7/1994 | Mooney et al. | 380/25 |
| 5,381,478 | 1/1995 | Iijima | 380/44 |
| 5,383,454 | 1/1995 | Iijima | 235/492 |
| 5,471,045 | 11/1995 | Geronimi | 235/492 |

FOREIGN PATENT DOCUMENTS

| | | |
|---|---|---|
| 0304348 | 2/1989 | European Pat. Off. . |
| 0446940 | 9/1991 | European Pat. Off. . |
| 2611289 | 8/1988 | France . |
| 2635886 | 3/1990 | France . |
| 2635893 | 3/1990 | France . |
| 92/13322 | 8/1992 | WIPO . |

OTHER PUBLICATIONS

European Search Report dated Mar. 3, 1992.
European Search Report dated Jun. 11, 1996.

*Primary Examiner*—Wayne Amsbury
*Attorney, Agent, or Firm*—Cushman, Darby & Cushman IP group of Pillsbury Maidson & Sutro LLP

[57] ABSTRACT

In an IC card using a file management system for performing data management of a plurality of files obtained by dividing a data memory, when selection is performed to allow use of the file, discrimination ID information representing that each file is already selected is provided to each file. In accessing a file, the provided discrimination ID information is added to each access command to designate a specific access, and a file serving as an access target is recognized on the basis of the designated discrimination ID information, thereby accessing the file.

18 Claims, 13 Drawing Sheets

FILE DISCRIMINATION ID NO.

| ID 0 | ID 1 | ID 2 | |
|---|---|---|---|
| FINF 00 | FINF 10 | FINF 20 | LEVEL 0 |
| STS 00 | STS 10 | STS 20 | |
| FINF 01 | FINF 11 | FINF 21 | LEVEL 1 |
| STS 01 | STS 11 | STS 21 | |
| FINF 02 | FINF 12 | FINF 22 | LEVEL 2 |
| STS 02 | STS 12 | STS 22 | |

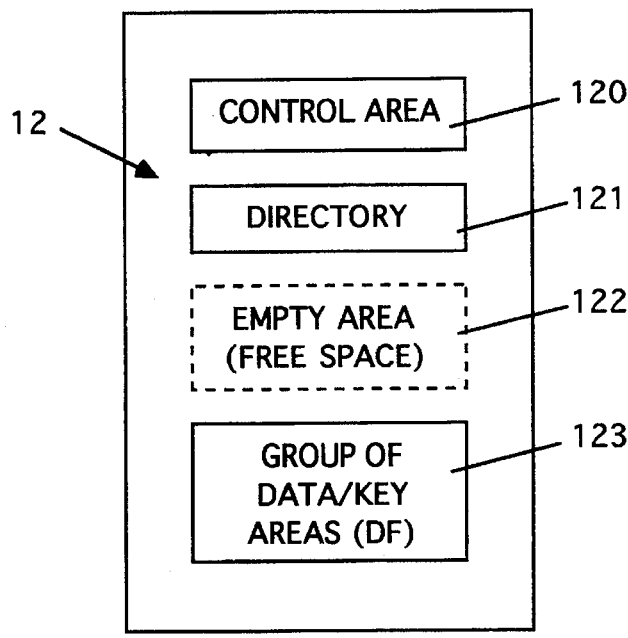
FIG. 3
FIG. 4A
| PTN | DFSN | DFID | NL | DF name | BCC |
FIG. 4B
| PTN | DFSN | PFSN | DFS | TYPE | DFAC | DFST | US | BCC |
FIG. 4C
| PTN | DFSN | AID | ATOP | ASIZ | AAC | AST | BCC |
FIG. 4D
| PTN | DFSN | KID | KTOP | KSIZ | CF | KAC | KST | BCC |
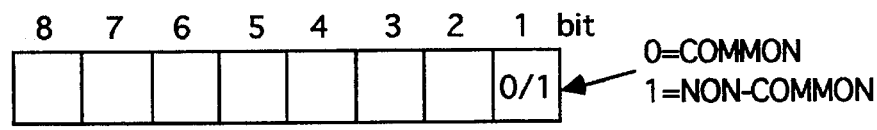
FIG. 5

| DEFINITION INFO. SERI. NUMBERS | DFSN | PFSN | FID | |
|---|---|---|---|---|
| #01 | 00 | 00 | 00 | MF DEFINITION INFO. |
| #02 | 00 | -- | 01 | K00 DEFINITION INFO. |
| #03 | 00 | -- | 02 | K01 DEFINITION INFO. |
| #04 | 00 | -- | 03 | D00 DEFINITION INFO. |
| #05 | 00 | -- | 04 | D01 DEFINITION INFO. |
| #06 | 01 | 00 | 11 | DF1 DEFINITION INFO. |
| #07 | 01 | -- | 01 | K11 DEFINITION INFO. |
| #08 | 02 | 00 | 12 | DF2 DEFINITION INFO. |
| #09 | 02 | -- | 01 | K21 DEFINITION INFO. |
| #10 | 01 | -- | 02 | K12 DEFINITION INFO. |
| #11 | 01 | -- | 03 | D11 DEFINITION INFO. |
| #12 | 01 | -- | 04 | D12 DEFINITION INFO. |
| #13 | 03 | 01 | 21 | DF1-1 DEFINITION INFO. |
| #14 | 03 | -- | 01 | K111 DEFINITION INFO. |
| #15 | 03 | -- | 02 | K112 DEFINITION INFO. |
| #16 | 03 | -- | 03 | D111 DEFINITION INFO. |
| #17 | 03 | -- | 04 | D112 DEFINITION INFO. |
| #18 | 04 | 01 | 22 | DF1-2 DEFINITION INFO. |
| #19 | 04 | -- | 01 | K121 DEFINITION INFO. |
| #20 | 04 | -- | 02 | K122 DEFINITION INFO. |
| #21 | 04 | -- | 03 | D121 DEFINITION INFO. |
| #22 | 04 | -- | 04 | D122 DEFINITION INFO. |
| #23 | 02 | -- | 02 | K22 DEFINITION INFO. |
| #24 | 02 | -- | 03 | D21 DEFINITION INFO. |
| #25 | 02 | -- | 04 | D22 DEFINITION INFO. |
| #26 | 05 | 02 | 31 | DF2-1 DEFINITION INFO. |
| #27 | 05 | -- | 01 | K211 DEFINITION INFO. |
| #28 | 05 | -- | 02 | K212 DEFINITION INFO. |
| #29 | 05 | -- | 03 | D211 DEFINITION INFO. |
| #30 | 05 | -- | 04 | D212 DEFINITION INFO. |
| #31 | 06 | 02 | 32 | DF2-2 DEFINITION INFO. |
| #32 | 06 | -- | 01 | K221 DEFINITION INFO. |
| #33 | 06 | -- | 02 | K222 DEFINITION INFO. |
| #34 | 06 | -- | 03 | D221 DEFINITION INFO. |
| #35 | 06 | -- | 04 | D222 DEFINITION INFO. |

FIG.7

FILE DISCRIMINATION ID NO.

| ID 0 | ID 1 | ID 2 | |
|---|---|---|---|
| FINF 00 | FINF 10 | FINF 20 | LEVEL 0 |
| STS 00 | STS 10 | STS 20 | |
| FINF 01 | FINF 11 | FINF 21 | LEVEL 1 |
| STS 01 | STS 11 | STS 21 | |
| FINF 02 | FINF 12 | FINF 22 | LEVEL 2 |
| STS 02 | STS 12 | STS 22 | |

FIG.8

FILE DISCRIMINATION ID NO.

| ID 0 | ID 1 | ID 2 | |
|---|---|---|---|
|  |  | #01 | LEVEL 0 |
|  |  |  | |
|  |  | #08 | LEVEL 1 |
|  |  |  | |
|  |  | #26 | LEVEL 2 |
|  |  |  | |

FILE DISCRIMINATION ID NO.
|  | ID 0 | ID 1 | ID 2 |  |
|---|---|---|---|---|
|  | #01 | #01 | #01 | LEVEL 0 |
|  |  |  |  |  |
|  | #06 | #06 | #08 | LEVEL 1 |
|  |  |  |  |  |
|  | #18 |  | #26 | LEVEL 2 |
|  |  |  |  |  |
|  | DF1-2 | DF1 | DF2-1 |  |
FIG.10
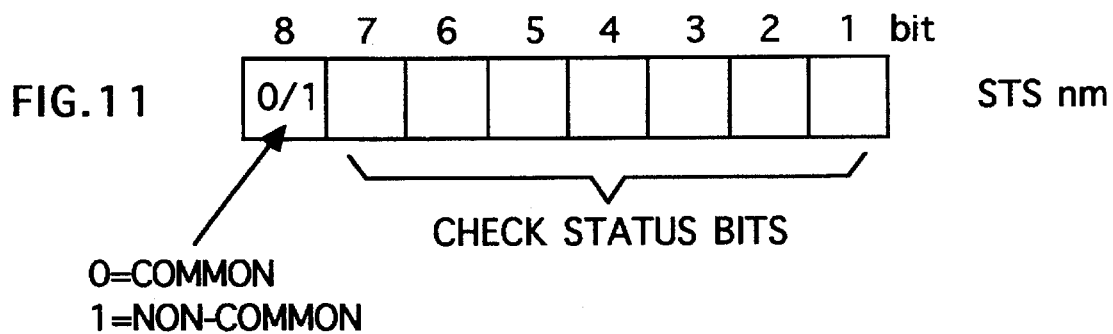
FIG.11
0=COMMON
1=NON-COMMON
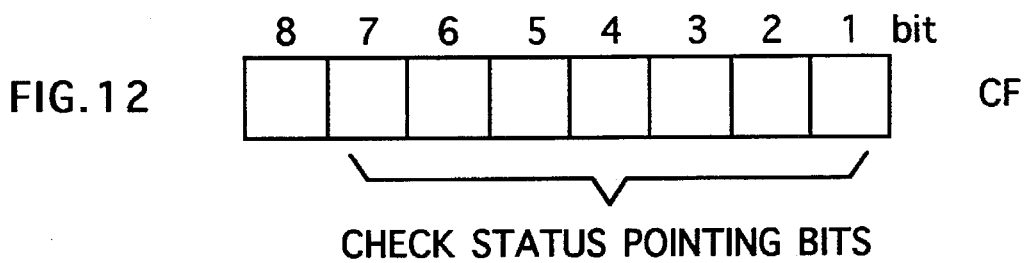
FIG.12

FILE DISCRIMINATION ID NO.

| ID 0 | ID 1 | ID 2 | |
|---|---|---|---|
| #01 | #01 | #01 | LEVEL 0 |
| A | B | C | |
| #06 | #06 | #08 | LEVEL 1 |
| D | E | F | |
| #18 |  | #26 | LEVEL 2 |
| G | H | I | |
| DF1-2 | DF1 | DF2-1 | |

FIG.21

FILE DISCRIMINATION ID NO.

| ID 0 | ID 1 | ID 2 | |
|---|---|---|---|
| #01 | #01 | #01 | LEVEL 0 |
|  | K00&K01 |  | |
| #06 | #08 | #08 | LEVEL 1 |
| K11* | K21 |  | |
| #13 |  | #26 | LEVEL 2 |
| K111* |  | K212* | |
| DF1-1 | DF2 | DF2-1 | |

FIG.22

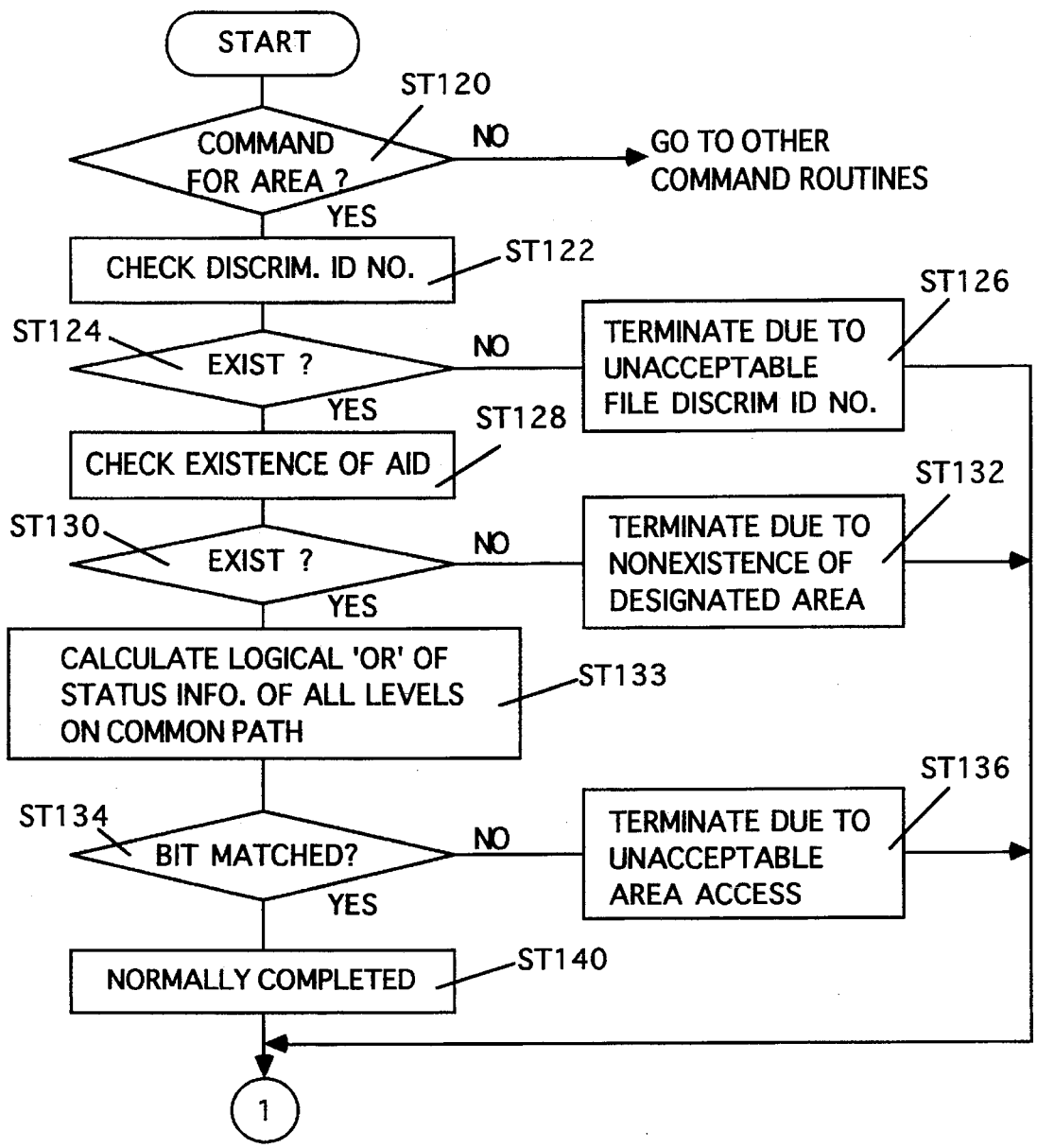
FIG.23
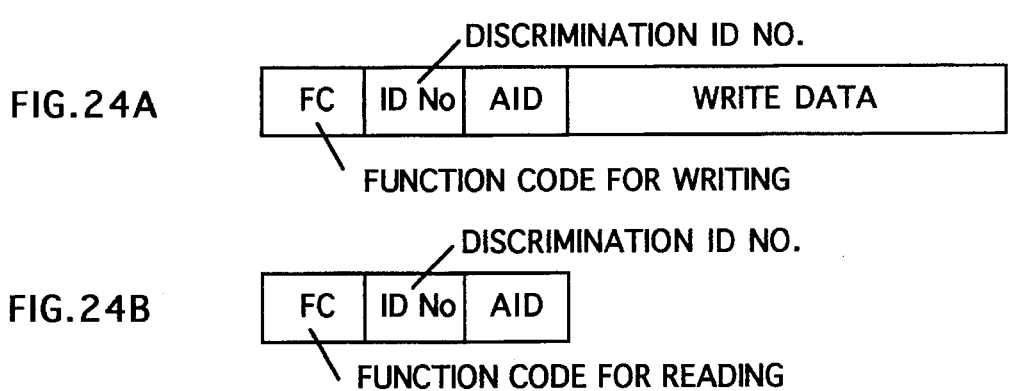
FIG.24A
FIG.24B

FILE MANAGEMENT SYSTEM FOR MEMORY CARD

BACKGROUND OF THE INVENTION

1. Field of the Invention

The present invention relates to a file management system for managing data of a plurality of files divided in a nonvolatile memory in a so-called IC card incorporating an IC chip having the nonvolatile memory and a control unit such as a CPU for controlling the nonvolatile memory and the like.

2. Description of the Related Art

In recent years, an IC card incorporating an IC chip having a nonvolatile data memory and a control unit such as a CPU for controlling the data memory and the like has received the great deal of attention as a portable data storage medium.

As described in U.S. Pat. No. 4,988,855 (Iijima), an IC card of this type divides an incorporated data memory into a plurality of files and stores data necessary for running a software application in each file. An application ID (identification) name is input from an external device to use selected or corresponding application data. For this reason, a plurality of application data are divided into files and stored in a single IC card, thus allowing multi-purpose applications.

The entire disclosure of U.S. Pat. No. 4,988,855 is incorporated in the present application.

A plurality of data files for storing data such as transaction data and a key file for storing key information for collating a password can belong to the above application files.

A file attribute called an access condition is set in each file. This access condition is determined by selectively designating a collation state of key information required at the time of access to the corresponding file. For example, when an access condition designates that the collation state of key information A in an IC card is required, key information A must be collated before this file is accessed.

Assume that a given application program is to access a file using a usable file discrimination ID number. For example, when this file is to be accessed using file discrimination ID number 1, file discrimination ID number 1 is set for the file, and key information A is collated using this file discrimination ID number 1, thereby allowing access to this file for the first time. Assume that another file discrimination ID number (e.g., discrimination ID number 2) is set by another external application. In this case, if the collation state of key information A which is established using file discrimination ID number 1 succeeds unconditionally, the above external application can access to the file, which requests the collation state of key information A, without collating key information A, thereby disabling security.

SUMMARY OF THE INVENTION

It is an object of the present invention to provide a file management system capable of maintaining a security environment for each application program even if a plurality of application programs access a plurality of files in a memory.

The file management system according to the present invention divides a memory into a plurality of files and manages the data of each divided file. The file management system comprises discrimination ID information providing parts, arranged to correspond in number to the plurality of files, for providing discrimination ID information representing a selected state to each file when this file is selected to be used, a designating part for adding discrimination ID information designated by the corresponding discrimination ID information providing part to each access command at the time of access to this file and designating this discrimination ID information, a file recognizing part for recognizing a target access file on the basis of the discrimination ID information designated by the designating part, a collating part for selectively collating key information of the file, corresponding to the discrimination ID number designated by the designating part, in response to an externally input validation key collation command, a storage part for storing a collation result of the collating part in correspondence with the discrimination ID information designated by the designating part, a referring part for referring access condition information of the file, corresponding to the discrimination ID information designated by the designating part, in response to an external input command, a comparing part for comparing the access condition information referred to by the referring part with the collation result corresponding to the discrimination ID information designated by the designating part, and a part for determining on the basis of a comparison result of the comparing part whether access to the file is allowed.

According to the present invention, the collation state of each of various key information for satisfying an access condition for a selected file can be set on only the selected file. Therefore, a security environment for each individual file can be maintained even if a plurality of application programs access a single IC card.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a memory map for explaining the storage contents of a data memory in the IC card in FIG. 2;

FIGS. 4A to 4D exemplify formats of various definition information used in the file management system according to the embodiment shown in FIG. 1;

FIG. 5 exemplifies the bit arrangement of data (TYPE) included in the format shown in FIG. 4B;

FIG. 7 shows contents of a directory area in the data memory contents in FIG. 3;

FIG. 8 is a view for explaining the arrangement of a file status storage area arranged in internal memory 11a in control unit 11 in FIG. 2;

FIG. 9 is a view showing the contents of the file status storage area in FIG. 8 when file DF2-1 is selected in the hierarchical structure in FIG. 6;

FIG. 10 is a view exemplifying the contents of the file status storage area in FIG. 8 when a plurality of files (DF1-2; DF1; DF2-1) are selected in the hierarchical structure in FIG. 6;

FIG. 11 exemplifies the bit arrangement of status information (STSnm) stored in the file status storage area in FIG. 8;

FIG. 12 exemplifies the bit arrangement of key type information (CF) included in a key area creation command in FIG. 14C so as to hold bit data to be compared with corresponding bits of the status information (STSnm) in FIG. 11;

FIG. 21 is a view for explaining settings of the contents (key information collation state) of the file status storage area in FIG. 8 when files DF1-2, DF1, and DF2-1 in the hierarchical structure in FIG. 6 are selected;

FIG. 22 is a view for explaining settings of the data in the file status storage area in FIG. 8 when files DF1-1, DF2, and DF2-1 in the hierarchical structure in FIG. 6 are selected (data with * indicates that "1" is set in the eighth bit of status information in FIG. 11, and its file key information is in non-common with other files);

FIG. 23 is a flow chart for explaining an area processing operation in the file management system shown in FIG. 1;

FIG. 24A exemplifies the format of a command for commanding a write operation in the area processing in FIG. 23; and FIG. 24B shows the format of a command for commanding a read operation in the area processing in FIG. 23.

DETAILED DESCRIPTION OF THE PREFERRED EMBODIMENTS

An embodiment of the present invention will be described below with reference to the accompanying drawings.

Figure 1:
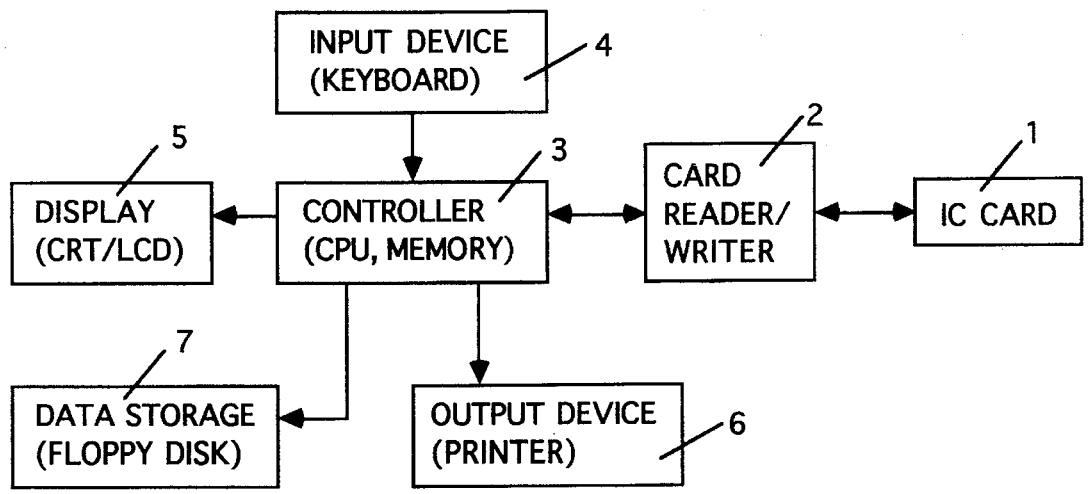
FIG. 1 is a block diagram exemplifying the arrangement of a card processing apparatus for processing an IC card to which a file management system according to an embodiment of the present invention is applied.

FIG. 1 shows the arrangement of a card processing apparatus used as a terminal apparatus of a banking system, a shopping system, or the like to which an IC card according to this embodiment is applied. More specifically, IC card 1 can be connected to controller 3 constituted by a CPU and the like through card reader/writer 2. Controller 3 is connected to keyboard 4, LCD (Liquid Crystal Display) or CRT (Cathode-Ray Tube) display 5, printer 6, and floppy disk 7.

Figure 2:
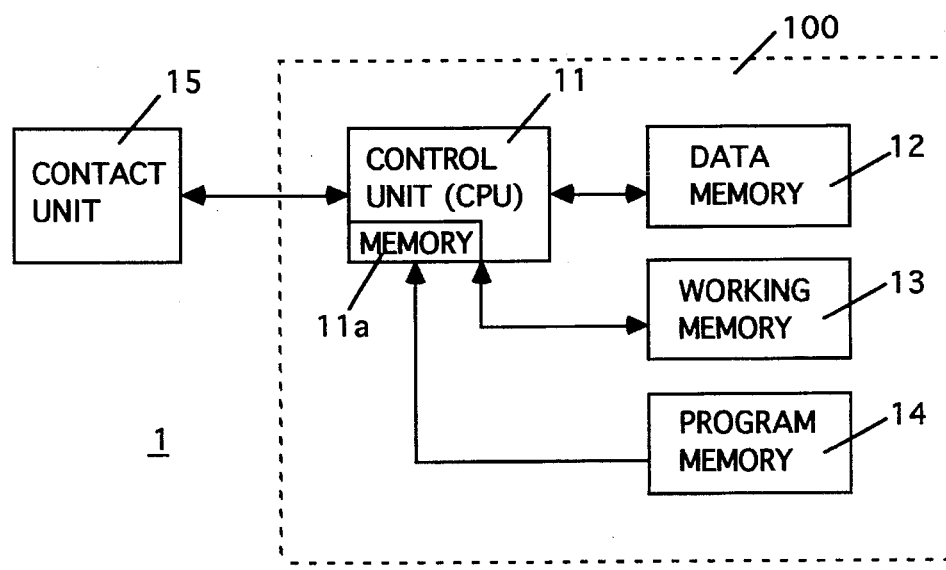
FIG. 2 is a block diagram exemplifying the internal arrangement of the IC card in FIG. 1.

FIG. 2 shows the arrangement of IC card 1. IC card 1 comprises control unit (e.g., CPU) 11 serving as a controller, nonvolatile data memory 12 whose storage contents can be erased, working memory 13, program memory 14, contact unit 15 brought into electrical contact with card reader/writer 2. Of these components, part 100 surrounded by a dotted line (control unit 11, data memory 12, working memory 13, and program memory 14) is constituted by one IC chip (or a plurality of IC chips) and is embedded in the IC card main body. Unit 11 includes memory 11a for storing data in FIG. 8 (to be described later).

Data memory 12 is used to store various data and is constituted by an EEPROM. Working memory 13 is a memory for temporarily holding processing data to be processed by control unit 11 and is constituted by a RAM or the like. Program memory 14 is constituted by, e.g., a mask ROM and stores programs for control unit 11.

As shown in FIG. 3, data memory 12 is divided into control area 120, directory 121, empty area (free space) 122, and group 123 of data/key areas. Group 123 can have a plurality of data areas and a key area and can be grouped by a concept called a data file (DF). An MF (Master File) to be described later is collectively managed as one form of a data file.

A data file is a file for collectively managing the key area and a data file used for a corresponding application program.

A data area is an area for storing data such as transaction data to be read/write-accessed, as needed.

The key area is an area used for storing, e.g., a password, and serves as a write/rewrite/collation target but cannot serve as a read target.

The above areas are collectively allocated as group 123 of data/key areas in memory 12, as shown in FIG. 3. The physical positions (addresses) of the files or areas can be recognized by control unit 11 using directory 121 in data memory 12.

Control area 120 in FIG. 3 stores leading address information of group 123 and leading address information of empty area 122.

Directory 121 in FIG. 3 stores various definition information corresponding to each data file and each area, as shown in FIGS. 4A to 4D.

FIG. 4A shows information defining the name of a data file. This definition information comprises data PTN for identifying data file name definition information in directory 121, file serial number DFSN assigned to this data file, data DFID for identifying this data file, file name DFname assigned to this data file, data NL representing its length, and data BCC for checking validity of all the above data.

FIG. 4B shows information for defining management information of data files. This definition information comprises data PTN for identifying data file name definition information in directory 121, file serial number DFSN assigned to this data file, serial number PFSN of a parent file of this data file, size data DFS of this data file, data TYPE representing the type of this data file, data DFAC representing the access condition of this data file, data DFST for holding the state of this data file, number US of bytes used by each data file and each area which are lower in level than this data file, and data BCC for checking the validity of all the above data.

The MF (Master File) does not have the above data file name definition information.

FIG. 5 shows the format of data TYPE in FIG. 4B. As shown in FIG. 5, data TYPE is constituted by one byte. The first bit represents information which determines whether the collation state of key information (to be described later) is common or shared. If this bit is set at "0", the collation state is common. However, if the bit is set at "1", the collation state is non-common.

FIG. 4C shows information for defining an area for storing various transaction data. This definition information comprises data PTN for identifying area definition information in directory 121, serial number DFSN of a data file to which this area belongs, discrimination ID number AID for accessing this area, data ATOP representing the leading address of this area, data ASIZ representing the size of this area, data AAC representing the access condition of this area, data AST for holding the state of this area, and data BCC for checking validity of all the above data.

FIG. 4D shows information for defining an area for storing various key information. This definition information comprises data PTN for identifying the key area definition information in directory 121, serial number DFSN of a data file to which this area belongs, discrimination ID number KID for accessing this area, data KTOP representing the leading address of this area, data KSIZ representing the size of this area, data CF representing the type of key information, data KAC representing the access condition of the key information, data KST for holding the state of the key information, and data BCC for checking validity of all the above data.

Discrimination ID information PTN used in each definition information is constituted by one byte. Data "00" is used for the data file name definition information (FIG. 4A); "01", for the information for defining data file management information ( FIG. 4B ); "02", for the data area definition information (FIG. 4C); and "03", for the key area definition information (FIG. 4D).

Figure 6:
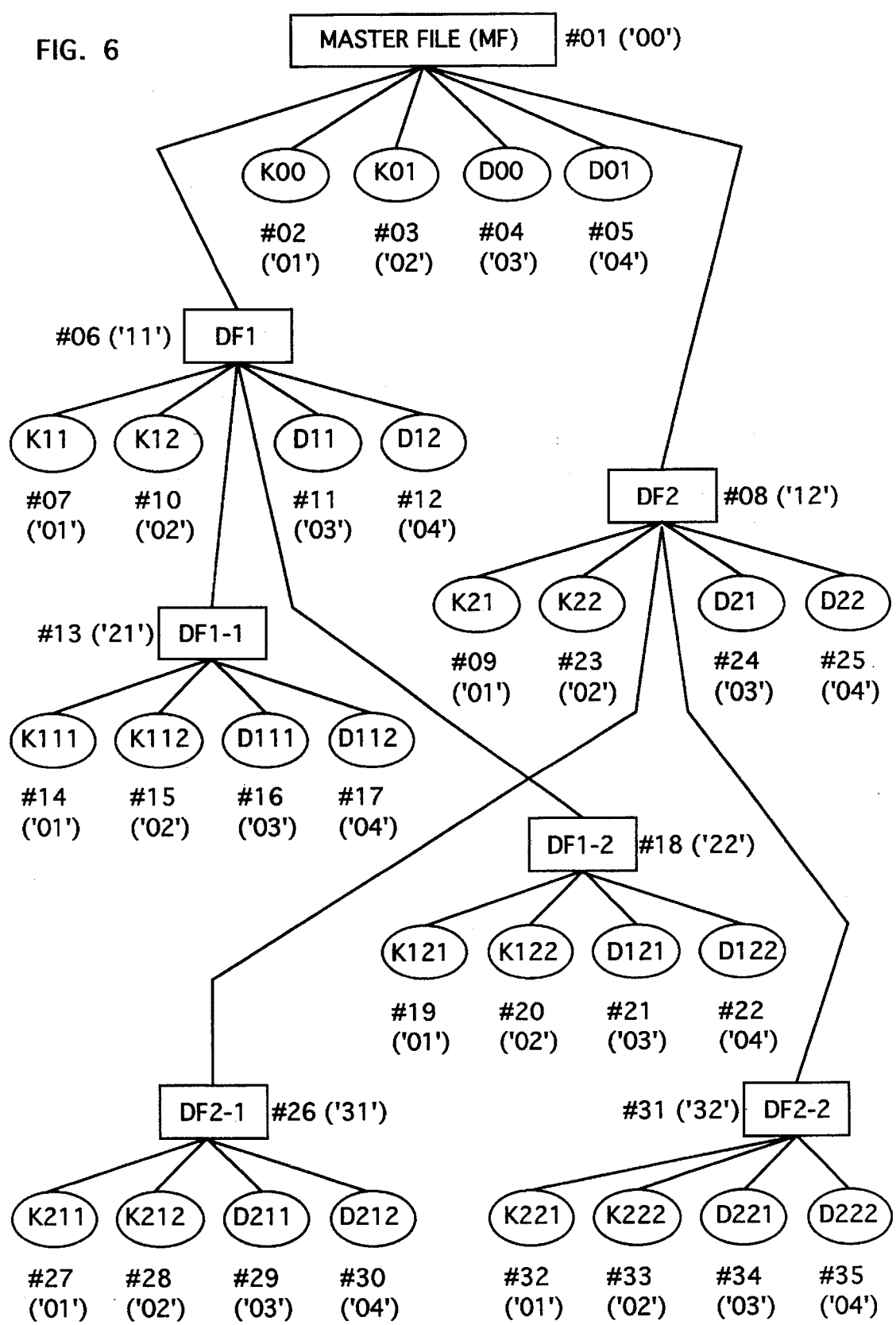
FIG. 6 is a view for explaining a file hierarchical structure used in the file management system shown in FIG. 1.

FIG. 6 shows the hierarchical structure of the files. Referring to FIG. 6, reference symbol DFnn denotes a data file (DF); Dnn, a data area; and Knn, a key area. In this case, #nn provided for each data file, each data area, and each key area represents the serial number of the definition information to be described with reference to FIG. 7, and numerical values in parentheses represent the file discrimination ID information (DFID) and the area discrimination ID information (AID). These pieces of discrimination ID information correspond to discrimination ID designating part FID in FIG. 7.

As shown in FIG. 6, DF1 and DF2 (data files), K00 and K01 (key areas), and D00 and D01 (data areas) are set under the MF (Master File) in data memory 12 in the IC card.

DF1-1 and DF1-2, K11 and K12, and D11 and D12 are set under DF1.

K111 and K112 and D111 and D112 are set under DF1-1, and K121 and K122 and D121 and D122 are set under DF1-2.

DF2-1 and DF2-2, K21 and K22, and D21 and D22 are set under DF2.

K211 and K212 and D211 and D212 are set under DF2-1, and K221 and K222 and D221 and D222 are set under DF2-2.

These pieces of definition information are collectively stored in directory 121, as shown in FIG. 7. DFSN (file serial number) is automatically assigned to each definition information at the time of file creation. Control unit 11 uses this DFSN and parent file sequence number PFSN stored in the data file definition information to define information associated with each file. The ID number of file discrimination ID information DFID or area discrimination ID information AID is stored in FID.

For example, as shown in FIG. 7, for the data file definition information (serial number #13) of DF1-1, DFSN is "03", PFSN is "01", and FID is "21". That is, data file DF1-1 is provided with file sequence number DFSN="03" at the time of creation. At the same time, data file DF1-1 is created under DF1, so that "01" is provided as PFSN. The file discrimination ID number (FID) of file DF1-1 is "21".

The format of the file status storage area for temporarily storing various status information will be described with reference to FIG. 8. This status information is stored in a predetermined area of internal memory 11a of control unit 11. The vertical direction corresponds to file levels 0, 1, and 2 (row numbers representing DFs of the respective layers starting from the MF), and the horizontal direction corresponds to file discrimination ID numbers 0, 1, and 2 (column numbers representing discrimination IDs). For this reason, row and column numbers in a matrix shown in FIG. 8 are specified to cause control unit 11 to discriminate a target file (current file).

A pair of file discrimination ID information (FINFnm) and corresponding status information (STSnm) are stored at the intersection of each component in the matrix shown in FIG. 8. In particular, the definition information serial number shown in FIG. 7 or address information which stores the definition information is used as file discrimination ID information FNF. At this time, n represents the file discrimination ID number; and m, the level of each file. For example, of the group of files defined by file discrimination ID number 2, FINF21 and STS21 in FIG. 8 store the file discrimination ID information and the status which correspond to level 1.

Path information (FINFnm and STSnm) from the master file (root directory) to the current file is stored in each ID column when a usable current file is created.

Storage of file status STS will be described using a file structure exemplified in FIG. 6. For example, if file discrimination ID number 2 is assigned to DF2-1 (the file discrimination ID number is assigned by a file selection command (to be described later)), MF serial number #01, DF2 serial number #08, and DF2-1 serial number #26 are stored in FINF20, FINF21, and FINF22 in FIG. 8, respectively (see FIG. 9). Status information is paired with corresponding information of each of #01, #08, and #26, and each pair is stored in a corresponding one of STS20, STS21, and STS22.

FIG. 10 shows a state after a plurality of data files DF are selected using a plurality of file discrimination ID numbers. More specifically, FIG. 10 shows a state after DF1-2 (serial number #18), DF1 (serial number #06), and DF2-1 (serial number #26) are selected using discrimination ID numbers 0, 1, and 2, respectively. In particular, the selected files are called "current DFs" for discrimination ID numbers 0, 1, and 2, respectively.

For example, the current DF corresponding to discrimination ID number 0 is DF1-2 (#18). Subsequently, when discrimination ID number 0 is designated by command data input to IC card 1, this DF1-2 is selected as the current DF inside IC card 1.

A format for storing these collation states is shown in FIG. 11. The collation information having this format is stored as status information STSnm in FIG. 8 in memory 11a of control unit 11. As shown in FIG. 11, the collation state of key information is stored from the first bit to the seventh bit.

At the same time, the value of the eighth bit defines whether this collation state is referred to (common) in access using other file discrimination ID information. The former collation state represented by the first to seventh bits is set or reset by a key collation command to be described later with reference to FIG. 19. The eighth bit representing whether the collation state is common is set on the basis of each DF type information (TYPE; FIG. 4B) constituting the path of a file selected by a file selection command to be described later with reference to FIG. 17.

Type information (CF; FIG. 4D) of key information assigned to each key area will be described below. This type information CF of the key information has a format, for example, as shown in FIG. 12. Any one of all collation state designation bits is set at "1", and the remaining bits are set at "0". The position of the bit set at "1" varies depending on key information.

For example, only the seventh bit of CF of K00 in the second row in FIG. 7 is set at "1", and only the sixth bit of CF of K01 in the third row in FIG. 7 is set at "1". A specific bit of the first to seventh bits of this information CF which is set at "1" is appropriately determined by an application program at the time of operation.

Figure 13:
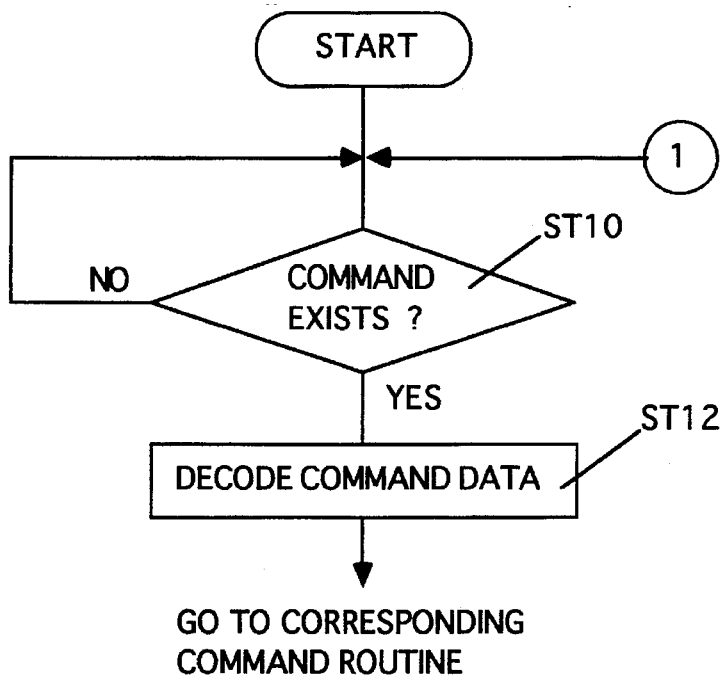
FIG. 13 is a flow chart for explaining an input routine of various command data input from the card processing apparatus in FIG. 1 to the IC card in FIG. 2.

The principle of operation of IC card 1 will be described with reference to FIG. 13. As shown in FIG. 13, IC card 1 is set in a command data wait state after being electrically activated. Control unit (CPU) 11 of IC card 1 continuously waits command data at this moment (NO in ST10). When the command data is input (YES in ST10), control unit 11 extracts a function code (FC) at the start of the command data, and the flow shifts to a corresponding command routine (ST12). The command routine is then executed. After a processing result is output, control unit 11 returns to a command data wait state.

Figure 14A:
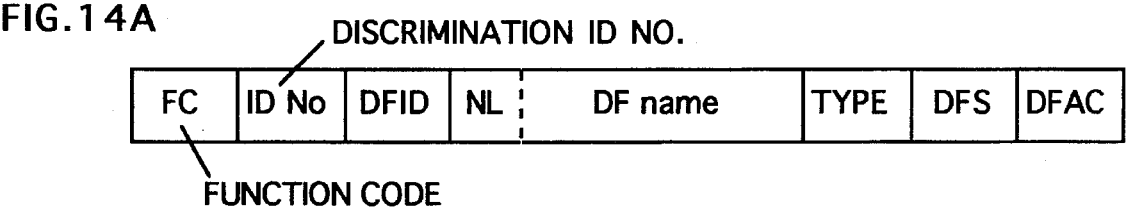
FIGS. 14A to 14C exemplify the formats of commands (file creation command; area creation command) used in the file management system shown in FIG. 1.
Figure 14B:
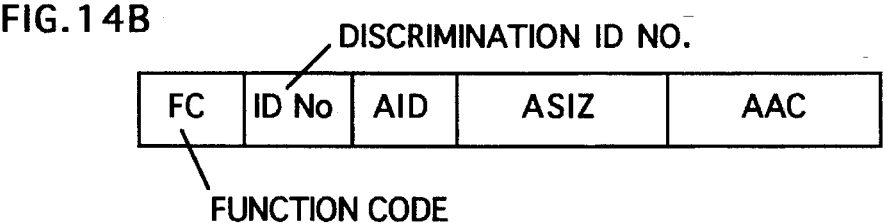
Figure 14C:
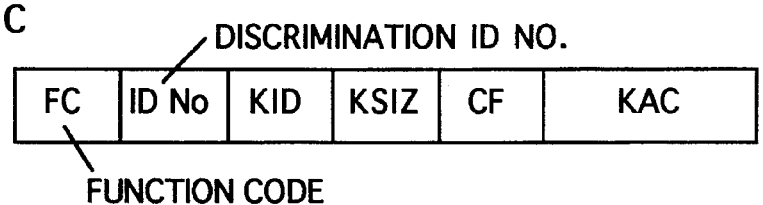

FIGS. 14A to 14C show the formats of file or area creation commands. FIG. 14A shows the format of a data file creation command, FIG. 14B shows the format of a data area creation command, and FIG. 14C shows the format of a key area creation command.

Figure 15:
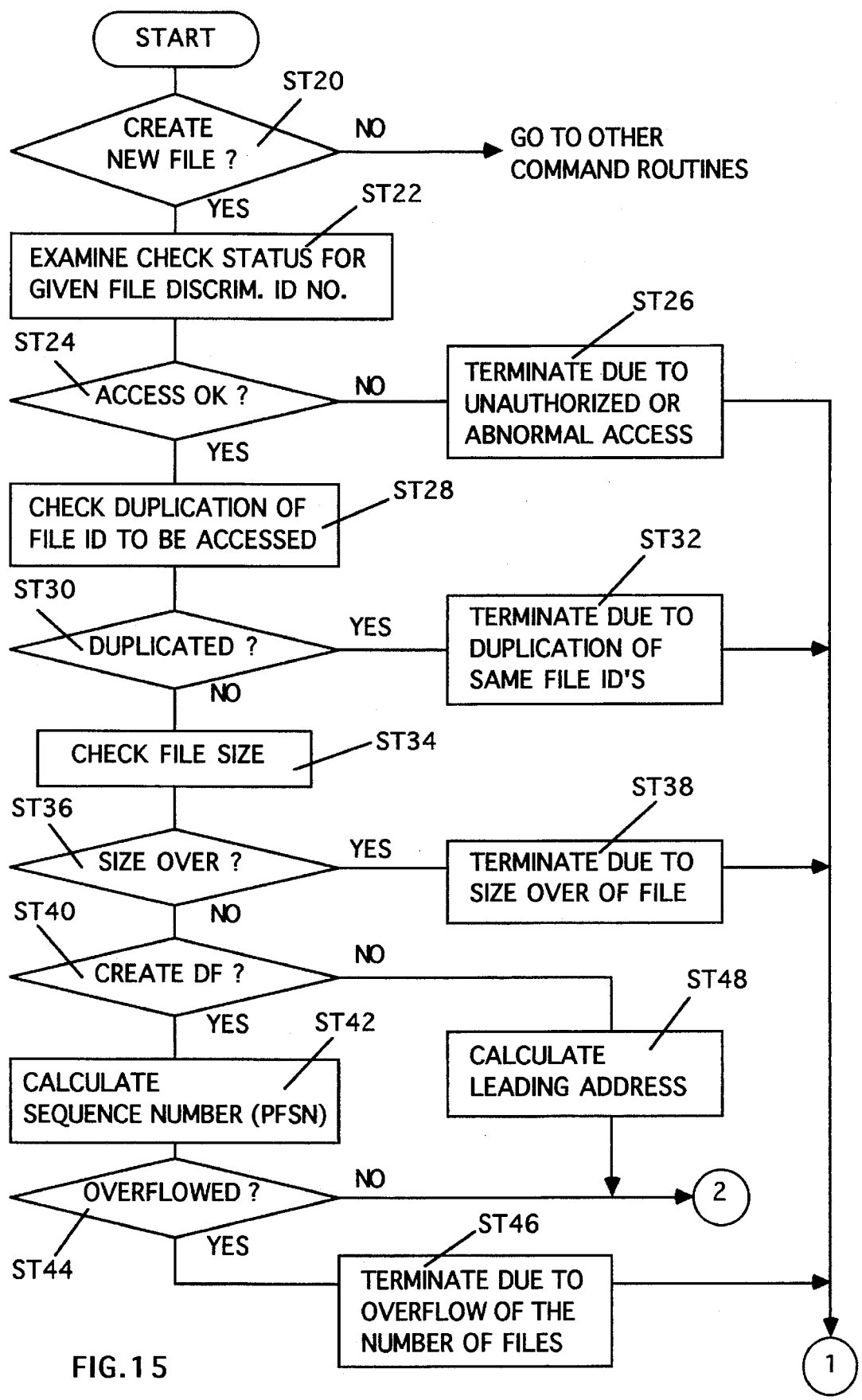
FIGS. 15 and 16 are flow charts for explaining a file/area creation operation in the file management system shown in FIG. 1.
Figure 16:
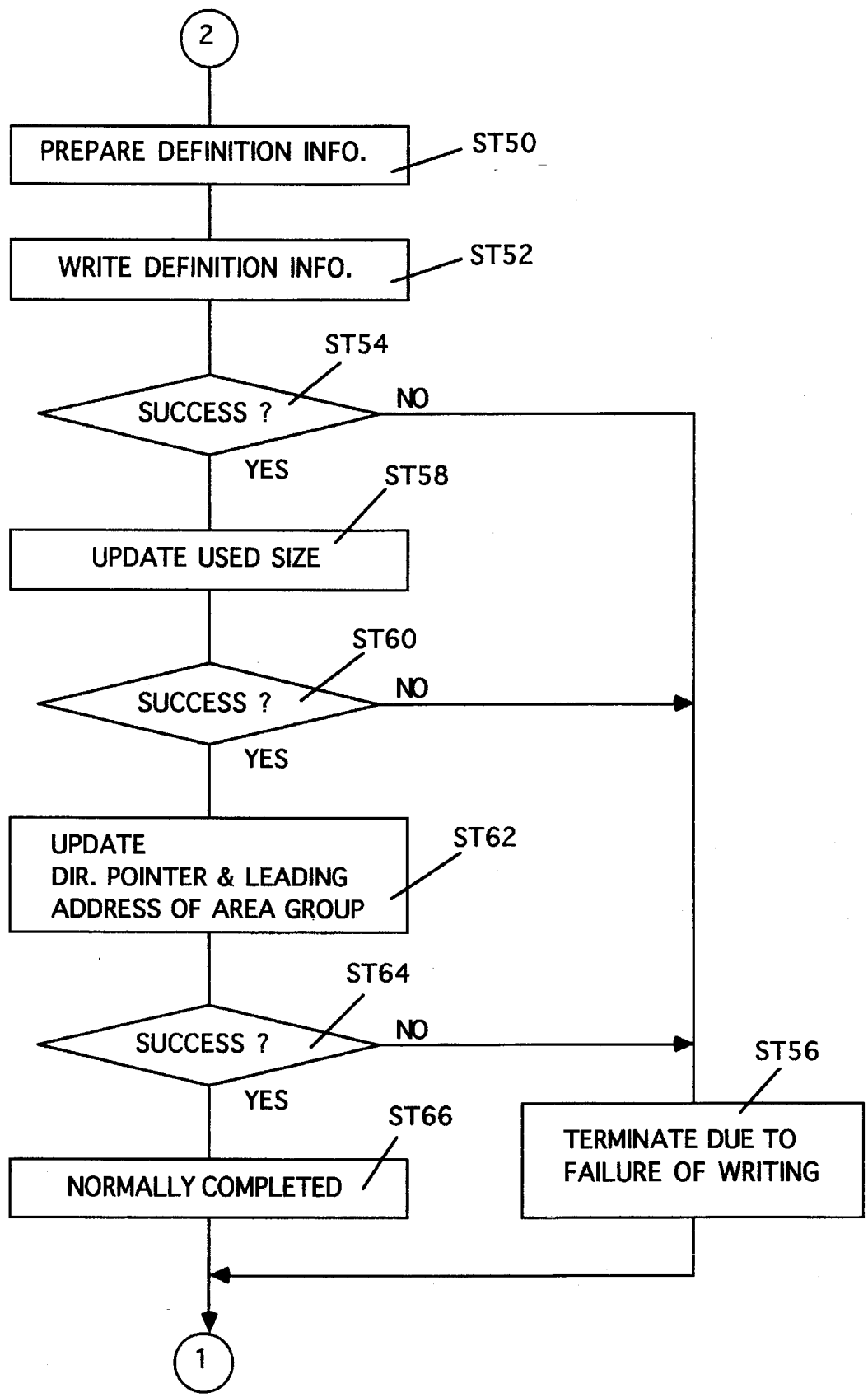

FIGS. 15 and 16 are flow charts for explaining operations for creating a file. When IC card 1 receives command data shown in FIG. 14A, control unit 11 detects from its function code FC that the input command data represents a file creation command (YES in ST20).

Check status for a given file discrimination ID number is examined (ST22). As a result of this check, whether access is OK is determined (ST24) in accordance with a collation state (STS) corresponding to the given file discrimination ID number (0, 1, or 2) represented by the command data and the access condition defined in the current DF (e.g., the file #26 for ID 2 in FIG. 9). This determination is performed by determining whether the status bit (one of the first to seventh bits) in FIG. 11 matches a corresponding one of the key information bits in FIG. 12. If access is not OK (NO in ST24), response data representing unauthorized or abnormal access is output (ST26), and control unit 11 returns to a command wait state (ST10 in FIG. 13).

If access is OK (YES in ST24), control unit 11 determines whether an assigned ID (discrimination ID information; FID in FIG. 7) designated by the next command is searched to exist in the current data file, i.e., whether this ID is duplicated (ST28). If the ID is duplicated (YES in ST30), response data representing duplication of the same file ID is output (ST32), and control unit 11 returns to the command wait state (ST10); otherwise (NO in ST30), the flow advances to the next step (ST34).

If processing in steps ST20 to ST30 are executed particularly for the data file creation command, in addition to the check of the duplication of the same ID, control unit 11 determines in step ST28 whether a data file name designated by the data file creation command already exists in IC card 1. If duplication of the same file is detected (YES in ST30), response data representing duplication of the same ID is output (ST32), and control unit 11 returns to the command wait state (ST10).

Control unit 11 determines whether a file size given by the command is valid (ST34). In this case, the sum (size) of the numbers of bytes used by definition information generated in the designated file is checked.

At this time, the file size of a current data file (current DF) is checked. More specifically, an unused size is calculated from the used size and the file size defined by the definition information of the current DF. The size required for creation and determined on the file size designated by the command is compared with the calculated unused size (ST34). As a result of this comparison, when the size required for creation is larger than the unused size (YES in ST36), response data representing the size over of the file is output (ST38), and control unit 11 returns to the command wait state (ST10).

If the size required for creation is equal to or smaller than the unused size (NO in ST36), control unit 11 determines whether the command requests data file creation (ST40). If so (YES in ST40), the minimum value (PFSN of a file closest to master file MF in FIG. 6) of sequence numbers PFSN not used by other data files at present is calculated (ST42). At this time, if no unused sequence number is found (YES in ST44), response data representing the overflow of the number of files is output (ST46), and control unit 11 returns to the command wait state (ST10); otherwise (NO in ST44), the flow shifts to definition information preparation processing (ST50) in FIG. 16.

If the command requests file creation except for the data file (NO in ST40), the leading address of a data file to be currently created is calculated on the basis of the file size designated by the command and the leading address of the area group stored in control area 120 (ST48). The flow shifts to the definition information preparation processing (ST50) in FIG. 16.

In the definition information preparation processing (ST50), if data file creation is determined (ST40→ST42→ST44→ST50 in FIGS. 15 and 16), definition information is created using data PTN representing a data file pattern, file sequence number DFSN searched in the previous processing, file sequence number PFSN of the parent file of the currently created file, data file name length NL designated by the command, data file name DFname, file size DFS, discrimination ID number AID for specifying a data file which stores data to be output in selection of the currently created file, and access condition DFAC (ST50). Note that initial values are set in data file status DFST and used size US, respectively. The discrimination ID number (FIG. 8) of the created file and its full path information are stored in internal memory 11a of control unit 11.

If data area creation is determined (ST40→ST48→ST50 in FIGS. 15 and 16), definition information is created using data PTN representing a data area pattern, file sequence number DFSN of a parent file of the currently created file, discrimination ID number AID designated by the command, size ASIZ, key information type CF, access condition AAC, and area leading address ATOP calculated in the previous processing (ST50). Note that an initial value is set in data area status AST.

If key area creation is determined (ST40→ST48→ST50), definition information is created using data PTN representing a key area pattern, file sequence number DFSN of a parent file of the currently created file, discrimination ID number KID designated by the command, size KSIZ, access condition KAC, and area leading address KTOP calculated in the previous processing (ST50). Note that an initial value is set in data area status KST.

The prepared definition information is stored in a memory area of data memory 12 from the directory pointer position (leading address of the empty area) in control area 120 to an address immediately before the leading address of the area group updated upon file creation (ST52). At the time, when writing of the definition information is not normally completed (NO in ST54), response data representing the failure of writing is output (ST56), and control unit 11 returns to the command wait state (ST10).

When writing of the definition information is normally completed (YES in ST54), the used size of the current file is updated (ST58). At this time, when updating of the used size is not normally completed (NO in ST60), response data representing the failure of writing is output (ST56), and control unit 11 returns to the command wait state (ST10).

When updating of the used size is normally completed or successful (YES in ST60), the directory pointer and the leading address of the area group are updated (ST62). When this updating is not successful (NO in ST64), response data representing the failure of writing is output (ST56), and control unit 11 returns to the command wait state (ST10). However, when updating of the directory pointer and the leading address of the area group is successful (YES in ST64), response data representing that updating is normally completed is output (ST66), and control unit 11 returns to command wait state (ST10).

Figure 17:
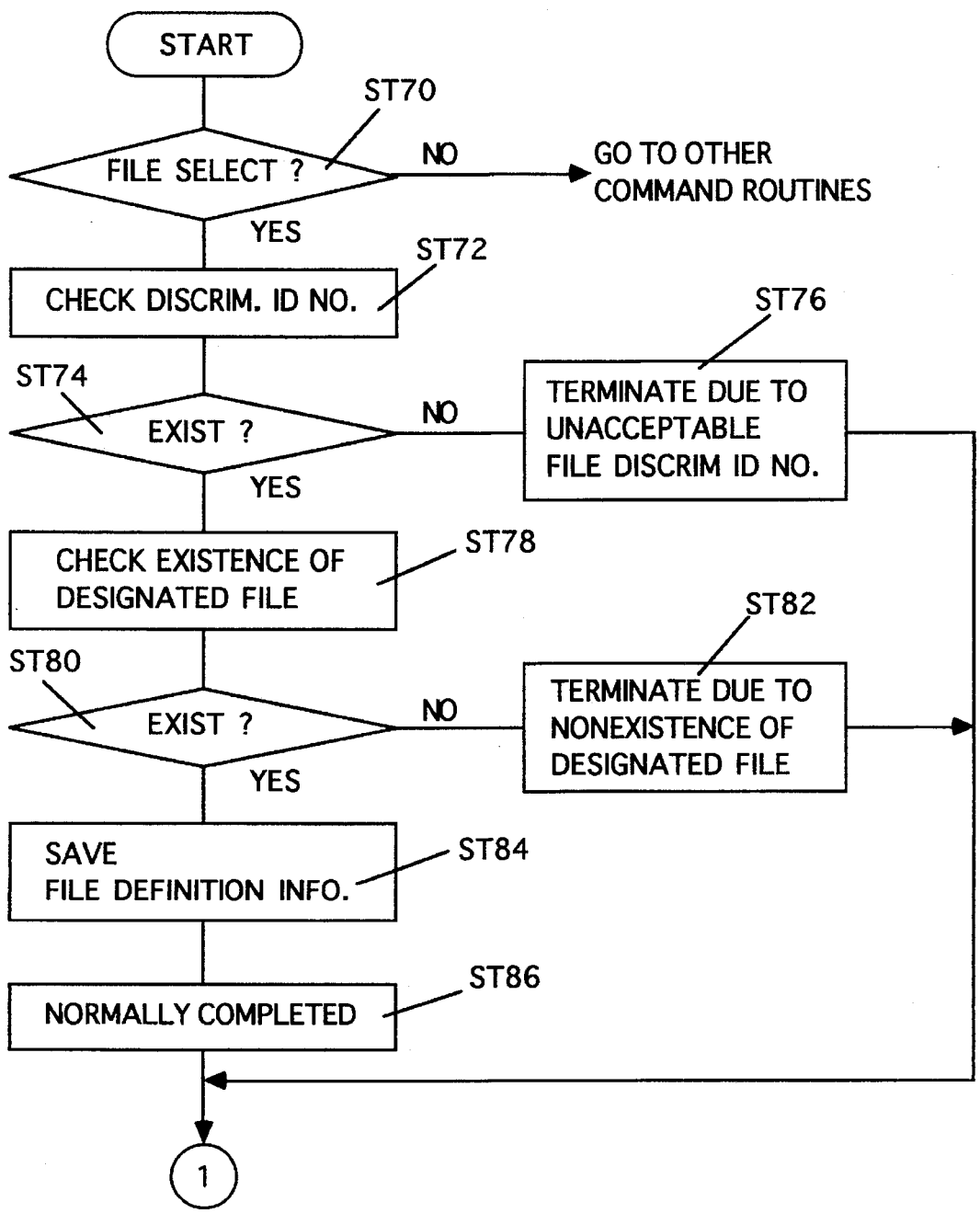
FIG. 17 is a flow chart for explaining a data file selection operation in the file management system shown in FIG. 1.
Figure 18:
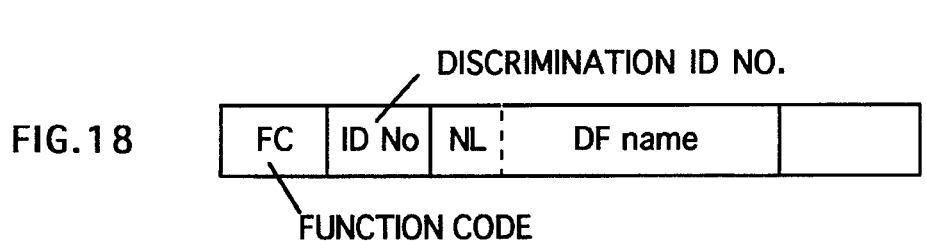
FIG. 18 exemplifies the format of a data file selection command for commanding the data file selection operation in FIG. 17.

The data file selection operation for setting a data file in a current state will be described with reference to a flow chart in FIG. 17. When IC card 1 receives a data file selection command shown in FIG. 18, control unit 11 detects the data file selection command using function code FC in the command (YES in ST70), and processing is executed according to the flow chart in FIG. 17.

It is checked if the file discrimination ID number designated by this data file selection command is supported by IC card 1 (ST72). That is, in the case of FIG. 8, control unit 11 checks if the file discrimination ID number is ID number 0, 1, or 2. If the file discrimination ID number which is not supported by IC card 1 (i.e., which does not exist in the matrix in FIG. 8) is designated (NO in ST74), response data representing an unacceptable file discrimination ID number is output (ST76), and control unit returns to the command wait state (ST10 in FIG. 13).

If the file discrimination ID number is supported by IC card 1 (YES in ST74), data file name information (DFname in FIG. 4) acknowledged by this data file selection command is extracted, and directory 121 is retrieved to determine whether the designated data file exists (ST78). If the designated data file does not exist (NO in ST80), response data representing nonexistence of the designated file is output (ST82), and control unit 11 returns to the command wait state (ST10).

If the designated file exists (YES in ST80), the flow advances to the next logical file discrimination ID number assignment processing. In this logical file discrimination ID number assignment processing, a data file path designated by this data file selection command is checked.

DF2-1 of FIG. 6 has file level 2 (the third row in the matrix of FIG. 8), and a file of level 1 higher than DF2-1 by one level is DF2. A file of level 0 higher than DF2 by one level is MF. For this reason, the path of DF2-1 is MF/DF2. This path can be searched toward higher levels in an order of sequence numbers PFSN of the parent files (DF2 and MF) of the data file (DF2-1) designated by the command.

Pieces of check information (representing final current files on this path) of a plurality of files on the path are extracted. The columns (FINF20 and FINF21) in FIG. 8 which correspond to the file discrimination ID number (ID=2 in FIG. 8) designated in advance for the current assignment are sequentially checked. New file discrimination ID information FINF22 is stored in the corresponding level, except for portions (FINF20 and FIN21) matching the pieces of check information of the files constituting the currently searched path (DF2-1/DF2/MF) (ST84). At this time, status information STS22 corresponding to updated file discrimination ID information FINF22 is initialized. Response data representing that the operation is normally completed is then output (ST86), and control unit 11 returns to the command wait state (ST10).

The first bit (e.g., "0") of TYPE (FIG. 5) of MF or DF2 constituting the path of file DF2-1 is referred to, and the bit value of the first bit is stored in an MSB (i.e., the eighth bit in FIG. 11) of corresponding status information STS22.

The information of each current data file (e.g., DF2-1) referred to by all the commands described above can be detected at the time of command execution.

A key information collation operation will be described with reference to a flow chart in FIG. 19.

Figure 20:
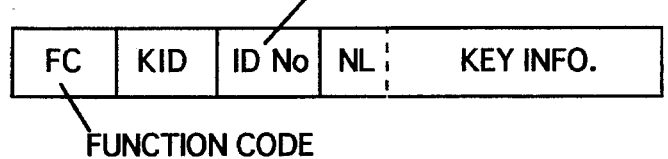
FIG. 20 exemplifies the format of a key collation command for commanding the key collation operation in FIG. 19.

When a key collation command shown in FIG. 20 is input to IC card 1 (YES in ST90), the file discrimination ID number (0, 1, or 2 in FIG. 8) in the command data is referred to, and control unit 11 checks if this file discrimination ID number is supported by IC card 1 (ST92). If the file discrimination ID number is not supported by IC card 1 (NO in ST94), response data representing an unacceptable file discrimination ID number is output (ST96), and control unit 11 returns to the command wait state (ST10).

If the file discrimination ID number is supported by IC card 1 (YES in ST94), the current data file (DF2-1) corresponding to the designated file discrimination ID information (FINF22) is confirmed on the basis of information (e.g., STS22) stored in the file status storage area shown in FIG. 8.

Of all the key area definition information (KID) having DFSN of the current data file, definition information having the same ID as KID designated by the command is searched (ST98). If this KID does not exist (NO in ST100), response data representing nonexistence of the designated key area is output (ST102), and control unit returns to the command wait state (ST10).

A relationship between the file discrimination ID numbers (0, 1, and 2 in FIG. 8), ID designating part FID, and an actually accessed file will be described with reference to FIG. 10.

Assume that the discrimination ID number is designated as "1", and that "03" is designated by the ID designating part in FIG. 20. In this case, #06 is stored in FINF of discrimination ID number "1", and data file DF1 in FIG. 6 is selectable (current file). When "03" is designated by the ID designating part, data file D11 in file DF1 is accessed.

When the discrimination ID number is designated as "0", and "03" is designated by the ID designating part, data file DF1-2 is selected (i.e., becomes the current file) because #18 is stored in FINF of discrimination ID number "0" (see FIG.

6). Since "03" is designated by the ID designating part in FIG. 20, data file D121 in file DF1-2 is accessed.

As described above, since the plurality of discrimination ID number storage parts having the format shown in FIG. 8 are arranged in internal memory 11a of control unit 11 in FIG. 2, a plurality of files can be simultaneously set in the current state (in the above case, files DF1 and DF1-2 become current files).

Figure 19:
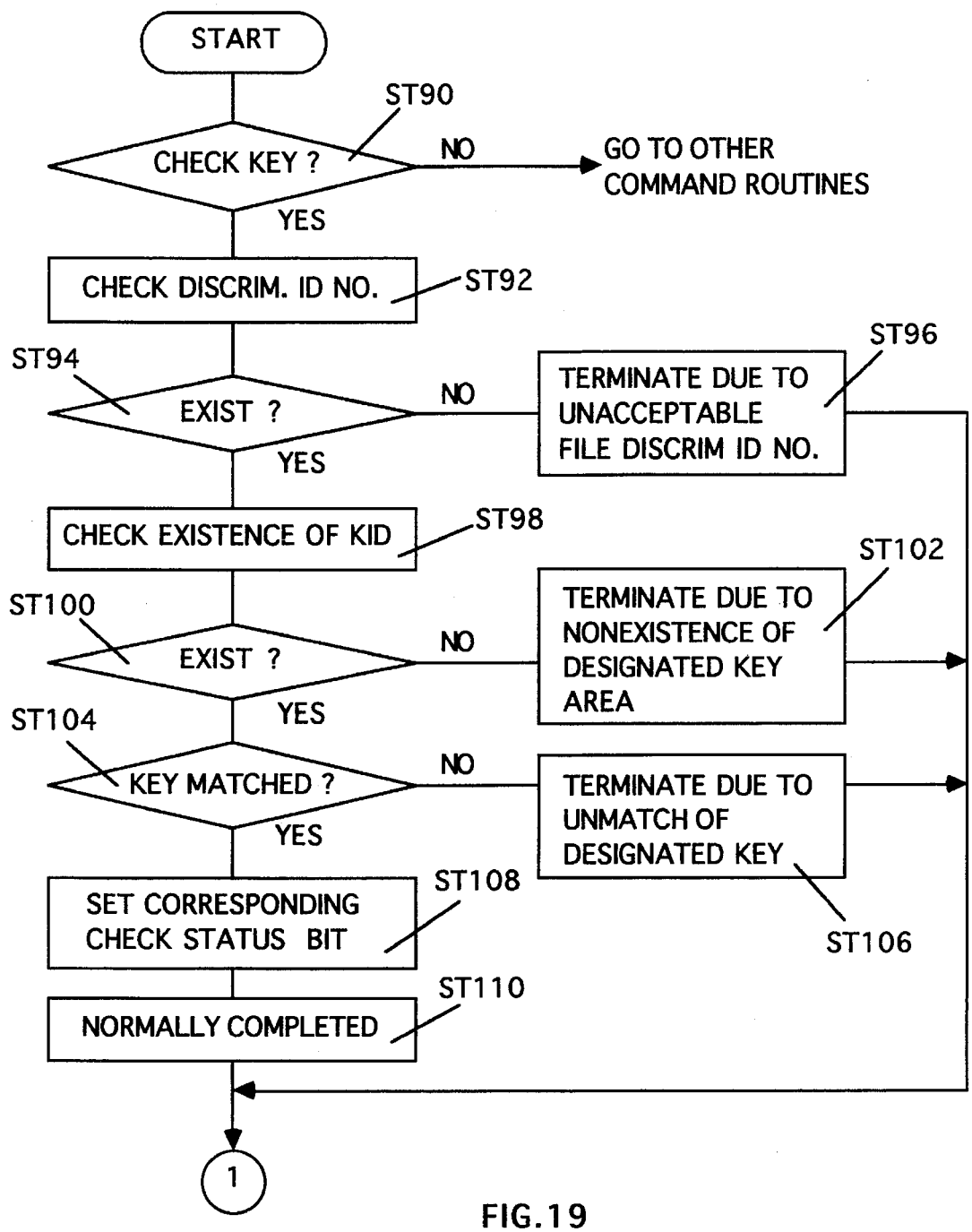
FIG. 19 is a flow chart for explaining a key collation operation in the file management system shown in FIG. 1.

In the flow chart of FIG. 19, if desired key information KID is found by the search operation using the definition information in FIGS. 4A to 4D (YES in ST100), the physical position at which actual key information is stored is detected from this information KID using KTOP and KSIZ (FIG. 4D), thereby extracting the stored key information. This key information is compared with the key information in the command data (ST104). If they are matched (YES in ST104), type information CF (FIG. 12) in the corresponding definition information is referred to, and a bit (any one of the first to seventh bits in FIG. 11) in corresponding status information STS (STS00 to STS22) at the same bit position as designated by type information CF is set to "1" (ST108). Response data representing that the operation is normally completed is output (ST100), and control unit 11 returns to the command wait state (ST10).

If the extracted key information and the key information in the command data are not matched (NO in ST104), the bit of corresponding status information STS is set to "0". Response data representing an unmatch of the designated key is output (ST106), and control unit 11 returns to the command wait state (ST10).

A method of referring to a collation state will be described with reference to FIG. 21. As previously described, internal memory 11a of control unit 11 has the collation state storage area for each level (0, 1, or 2) of each discrimination ID number (0, 1, or 2). This area is constituted by one byte. For example, the current file having file discrimination ID number 2 is DF2-1 represented by serial number #26. The collation states of levels 0, 1, and 2 for file discrimination ID number 2 of file DF2-1 are stored in C, F, and I, respectively.

FIG. 22 shows data storage in the file status storage areas shown in FIG. 8. As shown in FIG. 22, pieces of file check information having MF (serial number #01), DF1 (serial number #06), and DF1-1 (serial number #13) are stored in the respective levels corresponding to file discrimination ID number 0, respectively. This indicates that the final current file corresponding to file discrimination ID number 0 is DF1-1.

K11* and K111* are stored in pieces of status information STSnm at levels 1 and 2, respectively, and an empty state (initial state) is set for level 0. The above status information indicates that, after DF1 is selected by a key collation command using file discrimination ID number 0, key information stored in K11 is collated; and after DF1-1 is selected, key information stored in K111 is collated.

Information suffixed with an asterisk (*) indicates that the MSB of status information STS having the format shown in FIG. 11 is set at "1". That is, pieces of information TYPE corresponding to DF1 and DF1-1 have an attribute in which a key information collation state is "non-common". In particular, status information STS corresponding to level 0 is kept empty because a key collation command routine using file discrimination ID number 0 is not performed when the current file is MF.

Pieces of file check information of MF (serial number #01) and DF2 (serial number #08) are stored in the levels corresponding to file discrimination ID number 1. The initial state is kept held in the portion corresponding to level 2. This indicates that the final current file corresponding to file discrimination ID number 1 is DF2.

K00 and K01 are stored in STS10 at level 0 for file discrimination ID number 1. This indicates that pieces of key information in K00 and K01 under MF are collated by the key collation command using file discrimination ID number 1. In addition, K21 is stored in STS11 at level 1. This indicates that, after DF2 is selected by a file selection command using file discrimination ID number 1, key information stored in K21 under DF2 is collated by a key collation command using file discrimination ID number 1.

No asterisk (*) is suffixed to STS of each of levels 0 and 1 corresponding to file discrimination ID number 1. This indicates that the MSB of status information STS is set at "0". That is, pieces of information TYPE corresponding to MF and DF2 have an attribute in which a key information collation state is "common".

Pieces of file check information of MF (serial number #01), DF2 (serial number #08), and DF2-1 (serial number #26) are stored in the respective levels corresponding to file discrimination ID number 2. This indicates that the final current file corresponding to file discrimination ID number 2 is DF2-1.

STS20 and STS21 at levels 0 and 1 for file discrimination ID number 2 are kept empty. This indicates that key information under MF and DF2 is not collated. K212* is stored at level 2. This indicates that, after DF2-1 is selected by a file selection command using file discrimination ID number 2, key information stored in K212 under DF2-1 is collated using the key collation command using file discrimination ID number 2. Note that this status information STS provided with an asterisk (*) has an attribute in which TYPE of DF2-1 does not have a "common" key information collation state.

Access to group 123 of data/key areas in FIG. 3 will be described with reference to FIGS. 13, 23, 24A, and 24B.

When a command is sent from the card processing apparatus in FIG. 1 to IC card 1 (YES in ST10 of FIG. 13), the contents of this command are decoded (ST12). This decoding operation is performed by decoding function code FC in the command. If this command is a write command for a specific area, the command to be decoded has a format shown in FIG. 24A. However, if the command is a read command for the specific area, the command has a format shown in FIG. 24B.

If the command is determined as a command for area access (YES in ST120 of FIG. 23), which is the area write command in FIG. 24A, the following processing is executed by control unit (CPU) 11 inside IC card 1 in FIG. 2.

The discrimination ID number in the command is checked (0, 1, or 2 in FIGS. 8 or 10) (ST122). For example, if a write operation is to be performed for file DF1-2 managed by level 2 in the hierarchical structure in FIG. 6, ID0 in FIG. 10 is designated by the discrimination ID number in the command in FIG. 24A.

The data matrix (FIG. 10) representing the correspondence between the above discrimination ID numbers (0, 1, and 2) and the files managed by the hierarchical structure in FIG. 6 is stored in memory 11a in CPU 11 in advance. CPU 11 checks if the number designated by the discrimination ID number in the area access command (FIG. 24A) exists in memory 11a (ST124). If this command designates a nonexistent discrimination ID number (e.g., 4) (NO in ST124), the file discrimination ID number cannot be accepted, and processing is terminated (ST126). CPU 11 returns to a command wait state.

When this area access command (FIG. 24A) designates a discrimination ID number (e.g., 0) existing in memory 11a (YES in ST124), CPU 11 refers to directory 121 and checks if a file corresponding to area discrimination ID number AID in this command exists in group 123 in FIG. 3 (ST128). If such an area does not exist (NO in ST130), access to this area cannot be performed, and processing is terminated (ST132). CPU 11 returns to the command wait state in FIG. 13.

If a file corresponding to area discrimination ID number AID of this command exists in group 123 in FIG. 3 (YES in ST130), the logical "OR" of common key information (STS having the eighth bit of "0" in FIG. 11) included in status information STS associated with the file to be accessed by the area access command is calculated (ST133).

Assume that the key area of file DF1-2 having discrimination ID number ID0 in FIG. 10 is an access target.

Assume that pieces of 8-bit status information of master file MF (#01) of level 0 and file DF1-2 (#18) of level 2 are pieces of common key information (the eighth bit in FIG. 11 is set at "0"), and that 8-bit status information of file DF1 (#06) of level 1 is non-common key information (the eighth bit in FIG. 11 is set at "1"). Also assume that the first collation state bit of common key information (e.g., K00) of MF (#01) is set at "1", that the third collation state bit of the common key information (e.g., K121) of DF1-2 (#18) is set at "1", and that the second collation state bit of the non-common key information (e.g., K121*) of DF1 (#06) is set at "1".

The logical "OR" result (e.g., "00000101" starting from the MSB in the format in FIG. 11) in which the first and third collation state bits are set at "1" is obtained in step ST133. If DF1 (#06) of level 1 is also common key information, the logical "OR" result becomes "00000111".

If the first or third bit of collation state designation bits CF (FIG. 4D; FIG. 12) assigned to the key area of the access target file is not set at "1", collation state designation bits CF of the access target area is not matched with the above logical "OR" result ("00000101") (NO in ST134), processing is terminated due to unacceptable area access (ST136), and control unit 11 returns to the command wait state in FIG. 13.

If the first or third bit of collation state designation bits CF (FIG. 4D; FIG. 12) assigned to the key area of the access target file is set at "1", collation state designation bits CF of the access target area is matched with the above logical "OR" result ("00000101") (YES in ST134). Access to this file is accepted, the location of this file is determined based on the address and size data stored in directory 121, and write data contained in the command in FIG. 24A is written in the corresponding file area (ST140). Thereafter, control unit 11 returns to the command wait state in FIG. 13.

If the command sent from the card processing apparatus in FIG. 1 to IC card 1 is a read command from a specific area, the command decoded in step ST12 of FIG. 13 has the format in FIG. 24B.

When area access is determined upon decoding (YES in ST120 of FIG. 23), which is represented by the area read command in FIG. 24B, control unit (CPU) 11 in IC card 1 in FIG. 2 performs the same processing (ST122 to ST136) as the area write command in FIG. 24A. Thereafter, an operation for reading data from the access-allowed area is performed (ST140), and control unit 11 returns to the command wait state in FIG. 13.

Rules for referring to the contents of status information STS in access condition determination performed upon actual reception of a command will be described below.

Rule (1): If FINF of level 0 corresponding to the discrimination ID number (0, 1, or 2) designated by a command is empty, response data representing the nonexistence of a current file is output, and control unit 11 returns to the command wait state (unacceptable access).

Rule (2): A path corresponding to the designated discrimination ID number (0, 1, or 2) is referred to. If part of this path is shared by a path corresponding to the remaining discrimination ID numbers, status information STS of all levels corresponding to the designated discrimination ID numbers is logically ORed with status information STS which does not have any asterisk, shares the path, and is selected from all status information STS of the remaining discrimination ID numbers, and the logical "OR" result is used to determine access (ST133 and ST134 in FIG. 23).

Rule (3): A path (ID train in FIG. 8) corresponding to the designated discrimination ID number is referred to. If a path corresponding to the remaining discrimination ID numbers which share the path including all the ID train exists, status information STS of all levels corresponding to the designated discrimination ID number is logically ORed with status information ST of all levels corresponding to the remaining discrimination ID numbers except for status information STS each with an asterisk within the remaining discrimination ID numbers. The logical "OR" result is used to determine access.

In the case of FIG. 22, for example, when discrimination ID number 0 is used, a path for DF1-1 in FIG. 6 is given as #01/#06/#13. The final key information collation state which shares part of this path is given by K00 & K01 & K11 & K111. If logical "OR" result of the first to seventh bits (FIG. 11) of common key K00 & K01 without any asterisk is matched with information CF in FIG. 12, key matching is established. If discrimination ID number 1 is used, a path is given as #01/#08, and the key information collation state is given by K00 & K01 & K21. If discrimination ID number 2 is used, a path is given as #01/#08/#26, and the key information collation state is given as K00 & K01 & K21 & K212. As for discrimination ID number 1 or 2, the logical "OR" result of the bits (FIG. 11) of K00, K01, and K21 each without an asterisk is calculated to check if key matching with CF in FIG. 12 is established.

In this embodiment, whether the key information collation state is common is set as a data file attribute (TYPE in FIG. 5), and this attribute is used. However, whether the key information collation state is common may be set as an attribute of the entire IC card. For example, no common key for all files exists in an IC card with an asterisk, and security of all the files can be perfectly guaranteed.

In this embodiment, unless any file is selected, FINF of level 0 corresponding to the used discrimination ID number is not set. However, after an IC card is electrically activated (initialized), file discrimination ID information FINF of level 0 corresponding to all discrimination ID numbers may be set as #01, i.e., MF.

Rule (3) for extracting a collation state may be replaced with rule (3a) as follows.

Rule (3a): A path (ID train in FIG. 8) corresponding to the designated discrimination ID number is referred to. If a path corresponding to the remaining discrimination ID numbers which share the path including all the ID train exists, status information STS of all levels corresponding to the designated discrimination ID number is logically ORed with status information ST of only a portion sharing the path corresponding to the remaining discrimination ID numbers except for status information STS each with an asterisk within the remaining discrimination ID numbers. The logical "OR" result is used to determine access.

In this embodiment, an IC card has been exemplified as a memory card medium for performing file management. The housing structure of this medium is not limited to a card-like shape, but can be modified like a rod- or block-like shape. In addition, the apparatus is not limited to only a portable electronic apparatus. The present invention is applicable to any apparatus. The contents of the arrangement can be variously changed and modified without departing the spirit and scope of the invention.

The IC card exemplified in the above embodiment uses a contact portion for exchanging data with an external device. However, data exchange may be performed by a method using light, an electric field, or a magnetic field without direct contact with the external device.

As has been described above, according to the present invention, there is provided a file management system capable of using application programs to efficiently perform, e.g., access to a plurality of files within an IC card.

According to the present invention, the collation states of various key information, which satisfy access conditions for a selected file can be effected on only the selected file. Therefore, there is provided a file management system capable of maintaining each individual security environment even if a plurality of application programs access a single IC card.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A file management system wherein a memory is divided into a plurality of regions allotted to a plurality of files, respectively, and the files are accessed based on external commands, the file management system comprising:

a directory for storing file definition information including file names, file location information and size information, and file discrimination information corresponding to the file definition information;

a file status storage having a plurality of storage areas for storing file discrimination information of current files;

referring means for, when a file selection external command including a command code, a file discrimination ID number and a file name is received, referring to the directory based on the file name contained in the file selection external command, for adding the file discrimination ID number of file discrimination information corresponding to the file name, and for storing the file discrimination information in the storage areas of the file status storage; and detecting means for, when a file access external command including a command code and a file discrimination ID number is received, detecting file discrimination information having the file discrimination ID number contained in the file access external command from the file status storage; and means for referring to the directory based on the file discrimination information detected by the detecting means, and for accessing a file corresponding to the detected file discrimination information.

2. A memory card having a memory for storing a plurality of files using a hierarchical file management system by which said plurality of files are managed with a tree-like structure having a root directory, said memory card comprising:

(A) location information storing means for storing location information pieces indicating respective locations of two or more independent current files in the memory, which current files are associated with different file discrimination ID numbers and are accessible from an outside of the memory card, the location information pieces including:
      (i) a first file location information which specifies a first pass from the root directory to a hierarchical location of a first one of the current files; and
      (ii) a second file location information which specifies a second pass from the root directory to another hierarchical location of a second one of the current files; and said location information storing means having a matrix structure comprising:
      (i) a row along which information of said first and second file location information is arranged, and
      (ii) a column along which information of the first or second pass starting from the root directory and ending at a location of the first or second current file is arranged;

(B) obtaining means, which decodes an external command sent from the outside and containing any of said file discrimination ID numbers, for obtaining one of the location information pieces from said location information storing means according to the file discrimination ID number contained in the decoded external command, said obtained one location information piece indicating the location of a specific one of the current files in said memory; and (C) executing means, which accesses the specific one current file indicated by the one location information piece obtained by said obtaining mean, for executing said external command with respect to the accessed specific one current file.

3. The memory card of claim 2, wherein a matrix cell defined by a cross-point between the row and the column of said matrix structure includes:

a first cell for storing file identification information of a file to be managed under said hierarchical file management system, and a second cell for storing key information associated with this file, said file identification information containing a serial number for arranging the file, and said key information containing a status bit for checking whether an access to the file is allowed.

4. The memory card of claim 3, wherein said external command contains a status pointing bit to be referred to the status bit, said executing means includes comparing means for comparing the status bit with the status pointing bit contained in said external command, so as to detect matching between the status bit and the status pointing bit, and said executing means executes said external command when said comparing means detects that the status bit matches the status pointing bit.

5. The memory card of claim 3, wherein said external command contains a status pointing bit to be referred to the status bit, said executing means includes:

logical means for obtaining a logical sum of the status bits of specific files on a pass from the root directory to a file to be accessed; and means for comparing the logical sum of the status bits, obtained by said logical means, with the status pointing bit contained in said external command, so as to detect matching between the logical sum and the status pointing bit, and wherein said executing means executes said external command when said comparing means detects that the logical sum matches the status pointing bit.

6. The memory card of claim 3, wherein said external command contains a status pointing bit to be referred to the status bit which contains a common indication bit indicating whether or not the key information is to be commonly applied, said executing means includes:

logical means for obtaining a logical sum of the status bits of particular files on a pass from the root directory to a file to be accessed, said key information being commonly applied to said particular files which are indicated as common files by said common indication bit; and means for comparing the logical sum of the status bits, obtained by said logical means, with the status pointing bit contained in said external command, so as to detect matching between the logical sum and the status pointing bit, and wherein said executing means executes said external command when said comparing means detects that the logical sum matches the status pointing bit.

7. A file management system wherein a memory is divided into to a plurality of regions allotted to a plurality of files, respectively, and the files are accessed based on external commands, the file management system comprising:

a directory for storing file definition information including file names, and file discrimination information corresponding to the file definition information;

a file status storage having a plurality of storage areas for storing file discrimination information of current files, file discrimination ID numbers being added to the storage areas for storing the file discrimination information;

referring means for, when a file selection external command including a command code, a file discrimination ID number and a file name is received, referring to the directory based on the file name contained in the file selection external command, and for storing file discrimination information corresponding to the file name in a storage area of the file status storage, said storage area being designated by the file discrimination ID number contained in the file selection external command;

detecting means for, when a file access external command including a command code and a file discrimination ID number is received, detecting the file discrimination information stored in the storage area having the file discrimination ID number contained in the file access external command, of the file status storage; and means for referring to the directory based on the file discrimination information detected by the detecting means, and for accessing a file corresponding to the detected file discrimination information.

8. A file management system according to claim 7, further comprising means for, if the file access external command is received and file discrimination information is not detected from the storage area having the file discrimination ID number contained in the file access external command, of the file status storage, outputting response information indicating that the file discrimination ID number is unacceptable.

9. A file management system according to claim 7, wherein the plurality of files are of hierarchical structure, and the file status storage is of matrix form, and has the plurality of storage areas, which are provided with file discrimination ID numbers, respectively in a column direction and which consecutively stores file discrimination information of upper files, constituting paths of current files, to the current files in a row direction.

10. A file management system according to claim 9, wherein, if the file access external command is received and file discrimination information is not stored in a storage area of highest level having a file discrimination ID number contained in the external command, of the file status storage, response information indicating no current file is present is outputted.

11. A file management system wherein a memory is divided into a plurality of regions allotted to a plurality of files, respectively, and the files are accessed based on external commands, the file management system comprising:

a directory for storing file definition information including file names and file access conditions, and file discrimination information corresponding to the file definition information;

a file status storage having a plurality of storage area for storing file discrimination information of current files and key collation results, said storage areas for storing the file discrimination information being provided with the discrimination ID numbers, respectively;

referring means for, when a file selection external command including a command code, a file discrimination ID number and a file name is received, referring to the directory based on the file name contained in the file selection external command, and for storing file discrimination information corresponding to the file name in a storage area of the file status storage, said storage area being designated by the file discrimination ID number contained in the file selection external command;

means for storing a plurality pieces of key information;

means for comparing key information supplied from the external commands with the key information stored in the storage means;

means for storing a comparison result of the comparing means in a prescribed area of the file status storage;

detecting means for, when a file access external command including a command code and a file discrimination ID number is received, detecting file discrimination information stored in a storage area having the file discrimination ID number contained in the file access external command, of the file status storage;

means for referring to the directory based on the file discrimination information detected by the detecting means, for comparing an access condition of a file corresponding to said file discrimination information with a key collation result stored in the prescribed area of said file status storage, and for checking whether or not file access is possible; and means for accessing the file designated by the file access external command based on a checking result of the checking means.

12. A file management system according to claim 11, wherein, when a current file designated by a file discrimination ID number is accessed, the checking means checks whether or not access to said current file is possible by using key collation state information of a file stored in a storage area having a different file discrimination ID number.

13. A file management system according to claim 12, wherein instruction information indicating whether or not key collation state information is shared between files different from each other in file discrimination ID number, is stored in advance as file definition information for respective files in the directory, and when a file is selected, instruction information together with a file discrimination ID number is stored in the file storage area.

14. A file management system according to claim 13, wherein, only if the instruction information indicates that they key collation state information is shared between the files different from each other in file discrimination ID number, the checking means checks whether or not access to another current file is possible by using said key collation state information.

15. A file management system according to claim 14, wherein the plurality of files are of hierarchical structure, and the file status storage is of matrix form and has the plurality of storage areas, which are provided with the file discrimination ID numbers, respectively, in a column direction and which consecutively store paired information of discrimination information and key collation state information of upper files, constituting paths of current files, to the current files in a row direction.

16. A file management system according to claim 15, wherein, when a current file designated by a file discrimination ID number is accessed, the checking means checks whether or not access to said current file is possible by using key collation state information of a file different from that of the current file in the row direction of said file discrimination ID number.

17. A file management system according to claim 16, wherein an area, for storing the key collation state information, of the file status storage has means for storing the instruction information indicating whether or not the key collation state information is shared between the files when a file is selected; and only if the instruction information indicates that the key collation state information is shared between the files, the checking means checks whether or not access to another file is possible by using said key collation state information.

18. A file management system according to claim 17, wherein instruction information indicating whether or not key collation state information is shared between files different from each other is stored in advance as file definition information for respective files in the directory, and when a file is selected, the instruction information together with a file discrimination ID number is stored in the file storage area.

* * * * *